No. 655,319. Patented Aug. 7, 1900.
D. R. WING.
SHAFT HANGER.
(Application filed Aug. 26, 1899.)
(Model.)
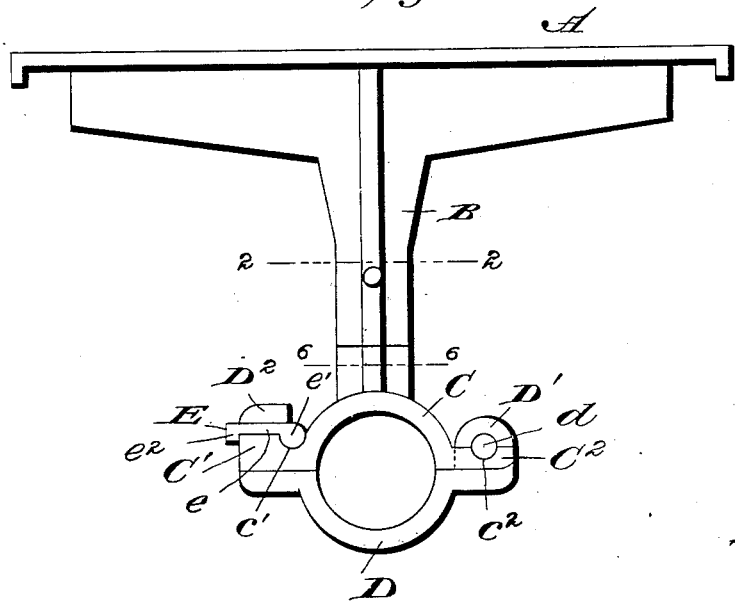
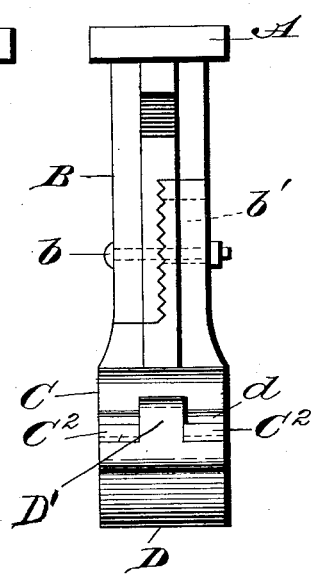
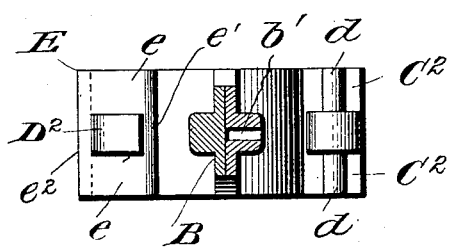
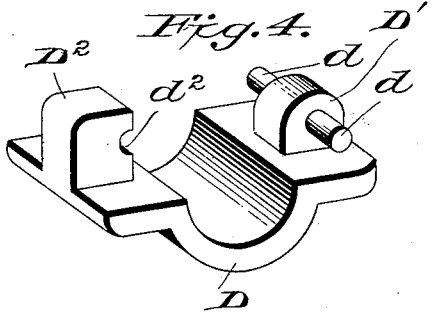
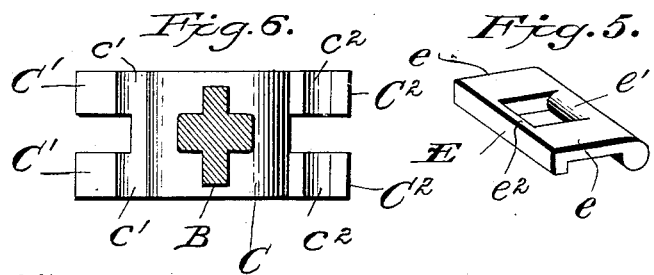
Dwight R. Wing, Inventor,
by John B. Thomas & Co., Attorneys.
Witnesses
G. S. Elliott.

UNITED STATES PATENT OFFICE.

DWIGHT R. WING, OF LITTLE ROCK, ARKANSAS.

SHAFT-HANGER.

SPECIFICATION forming part of Letters Patent No. 655,319, dated August 7, 1900.

Application filed August 26, 1899. Serial No. 728,609. (Model.)

*To all whom it may concern:*

Be it known that I, DWIGHT R. WING, a citizen of the United States, and a resident of Little Rock, in the county of Pulaski and State of Arkansas, have invented certain new and useful Improvements in Shaft-Hangers, of which the following is a specification.

The object of this invention is to provide a shaft-hanger or journal-box in which the cap or swinging section of the box is securely locked in place in such manner as to dispense entirely with the use of bolts or similar connections ordinarily employed and which are liable to work loose from the constant vibrations imparted to the bearing by the vibrations of the revolving shaft.

The invention therefore consists more especially in the peculiar manner of securely connecting the movable section of the shaft-bearing to the fixed or stationary section and comprises peculiarly-shaped lugs or members formed on one end of the shaft-bearing sections and adapted to register with each other when said sections are closed upon the shaft, together with a removable locking-plate adapted to be slid laterally into engagement with the aforesaid parts or members and swung down to lock them firmly together.

The invention further consists in the particular construction and combination of detail parts for the purposes hereinafter explained.

The following specification enters into a detail description of my improved shaft-hanger, reference being had to the accompanying drawings, and to letters thereon, which indicate the different parts, and what I claim as my invention, and desire full protection upon, is more specifically set forth in the appended claims.

In the drawings which form a part hereof, Figure 1 is a side elevation of a shaft-hanger constructed in accordance with my invention. Fig. 2 is a sectional plan view, the section being through the supporting-arm of the hanger, on the line 2 2 of Fig. 1. Fig. 3 is an end view of the shaft-hanger. Fig. 4 is a detail perspective view of the swinging section of the shaft bearing or box. Fig. 5 is a detail perspective view of the locking-key. Fig. 6 is a sectional view on the line 6 6 of Fig. 1, the cap and locking-plate being removed.

Referring to said drawings, A designates the wall-plate of the shaft-hanger, which is provided at its ends with the usual devices for attaching the same to a suitable support, and formed integrally with this plate is a depending arm B, adapted to support the improved shaft bearing or box. Said arm is preferably extensible or adjustable longitudinally and to this end is composed of two parts connected by an overlapping joint, through which passes a bolt $b$, one of the parts being provided with a slot $b'$ to permit of the adjustability, while the meeting faces of the joint are serrated transversely to form a more secure joint when the parts are clamped together by the bolt.

C designates the upper or fixed section of the shaft-bearing, and D the cap or removable section. The section C is formed integrally with the lower end of arm B and has a semicircular recess in its under side to receive the shaft, while a corresponding recess is formed in the upper side of the cap or removable section D to form a complete box for the shaft when the parts are closed thereon.

Both ends of the section C are bifurcated, as shown in Fig. 6, forming at one end the members or lugs $C'$ $C'$ and at the other end the lugs $C^2$ $C^2$. Across the upper side of the lugs $C^2$ are grooves $c^2$, which form the bearings for the pintles of the hinge connection hereinafter described, and across the upper side of the lugs $C'$ are grooves $c'$, forming bearings for the pin of the locking-plate.

The cap D is adapted to interlock with the section C and be securely held in engagement therewith, and for this purpose one end of said cap is provided with an upwardly-projecting lug $D'$, having integral pintles $d$ $d$, the lug being centrally located on the end of cap D in order to pass between the lugs $C^2$ of section C and permit the pintles to pass into the grooves $c^2$, thereby forming a hinge connection at one end of the hanger. It may be here noted that in disconnecting the parts at this hinge-joint the cap is swung down at right angles to section C, permitting an upward movement of said cap to free it from the lugs $C^2$, and it will also be noted that when the pintles are in engagement with the grooves $c^2$ and the cap is moved up against the section C to support the shaft this hinge forms a secure connection.

Now to provide for securely connecting the other end of the cap to the stationary part of the hanger said end is formed with an upwardly-projecting lug $D^2$, centrally located to pass between the lugs C' of section C, and said lug has a transverse groove $d^2$ on its inner side, which when the cap is in place against the section C will be on a line with the grooves c' to receive the locking-plate E. This locking-plate consists of a pin $e'$, having arms $e$ $e$, extending at a tangent therefrom and connected at their outer ends by a cross-bar $e^2$. When the cap is in place, with the lug $D^2$ projecting upward between the lugs C' of section C, the grooves c' and $d^2$ are on a line with each other, and a space is left between the upper end of the lug $D^2$ and section C to permit an arm of the locking-plate to pass by the lug in sliding said locking-plate into place, and to facilitate this operation the arms extend at a tangent from the pin, as hereinbefore described. With the cap in position the locking-plate is slid laterally into the grooves or recesses formed by the lugs, and said plate is then swung down, so that the arms $e$ $e$ will lie at opposite sides of the lug $D^2$ and rest upon the lugs C', the cross-bar $e^2$ extending across the outer side of said lug $D^2$. The pin of the locking-plate by engaging the groove or recess in the lug $D^2$ and being supported by the lugs C' of section C of the hanger will hold this end of the cap firmly in place, while the arms $e$ serve to prevent a displacement of said plate. The cross-bar $e^2$ forms a convenient means for manipulating the locking-plate and may serve to prevent movement of said plate. It is apparent, therefore, that the locking-plate forms a very secure connection for the cap, and that when said plate is swung down after being placed in engagement with the lugs there is no possible chance of its working out or becoming unfastened—an accident that is likely to occur in the use of the ordinary bolts and nuts and other similar devices.

Heretofore it has been customary to connect the cap to the other part of the bearing by the use of bolts and nuts; but this form of connection is objectionable, in that the nuts are liable to become loose and permit a play of the cap, allowing the shaft to sag or result in accident to the shaft.

My improved shaft-hanger dispenses entirely with the use of bolts and nuts and provides a simple and more effective means for firmly holding the cap in place, presenting a practical lock connection which will not become loose and will need no attention whatever after the connection has been made.

Though I have shown and described my invention as applied to a shaft-hanger, it is obvious that it is also applicable to other styles of shaft-bearings. It is also apparent that the cap instead of being entirely removable could be otherwise hinged at one end and that a change could be made in the interlocking parts by having two lugs $D^2$, which would embrace a single lug on the section C. The locking-plate could also have only a single arm to prevent its withdrawal and its movement in the other direction prevented by a lug on the bearing-section C. Instead of providing one end of the cap with the hinge connection hereinbefore described I may connect both ends by the lugs and locking-plate, or I may use some other connection in place of the hinge, though obviously the particular hinge connection herein shown and described will be found preferable, as it permits the cap to be swung down in removing the shaft and placing it in the hanger. I therefore do not wish to be limited to what is herein precisely shown and described, but desire to reserve the right to make such modifications as may come within the spirit and scope of my claims.

Having thus described my invention, what I claim as new, and desire to secure by Letters Patent, is—

1. In a shaft-hanger, the combination, of the stationary section and movable section or cap, lugs formed on said sections and adapted to interlock, the lug of one of the sections having a recess at one side adjoining the other section and above the lugs thereof; together with a locking-plate adapted to be slid laterally into engagement with the lugs and comprising a pin with arms projecting therefrom, the pin engaging the aforesaid recess and the arms adapted to be swung down to engage the lugs and prevent withdrawal of said plate, substantially as shown and for the purpose set forth.

2. In a shaft-hanger, the combination, of the stationary section and movable section or cap, lugs formed on said sections and adapted to interlock, the lug of one of the sections having a recess at one side above the lugs of the other section; together with a locking-plate comprising a pin, arms projecting therefrom and a cross-bar connecting the outer ends of said arms, the pin engaging the aforesaid recess while the arms and cross-bar engage the lugs and lock the plate in place, substantially as shown and for the purpose set forth.

3. In a shaft-hanger, the combination, of the stationary section and movable section or cap, lugs formed on said sections and adapted to interlock, the lug of one of the sections having a recess at one side and the lugs of the other section having grooves in their upper side on a line with the aforesaid recess forming a continuous recess open at one side; together with the locking-plate comprising a pin with arms projecting therefrom, the plate being adapted to be slid into engagement with the lugs and the arms adapted to be swung down to prevent withdrawal of said plate, substantially as shown and for the purpose set forth.

4. In a shaft-hanger, the combination, of the stationary section and movable section or cap, one of the sections being bifurcated at its ends and provided with grooves across the upper side of said bifurcated ends, lugs at the ends of the other section and adapted to pass into the bifurcated ends aforesaid, pintles projecting from one of the lugs and a recess at one side of the other lug; together with a locking-plate comprising a pin with arms projecting therefrom, substantially as herein shown, and for the purpose set forth.

DWIGHT R. WING.

Witnesses:
   GEO. REICHARDT, Jr.,
   J. MILLER.